July 12, 1949.

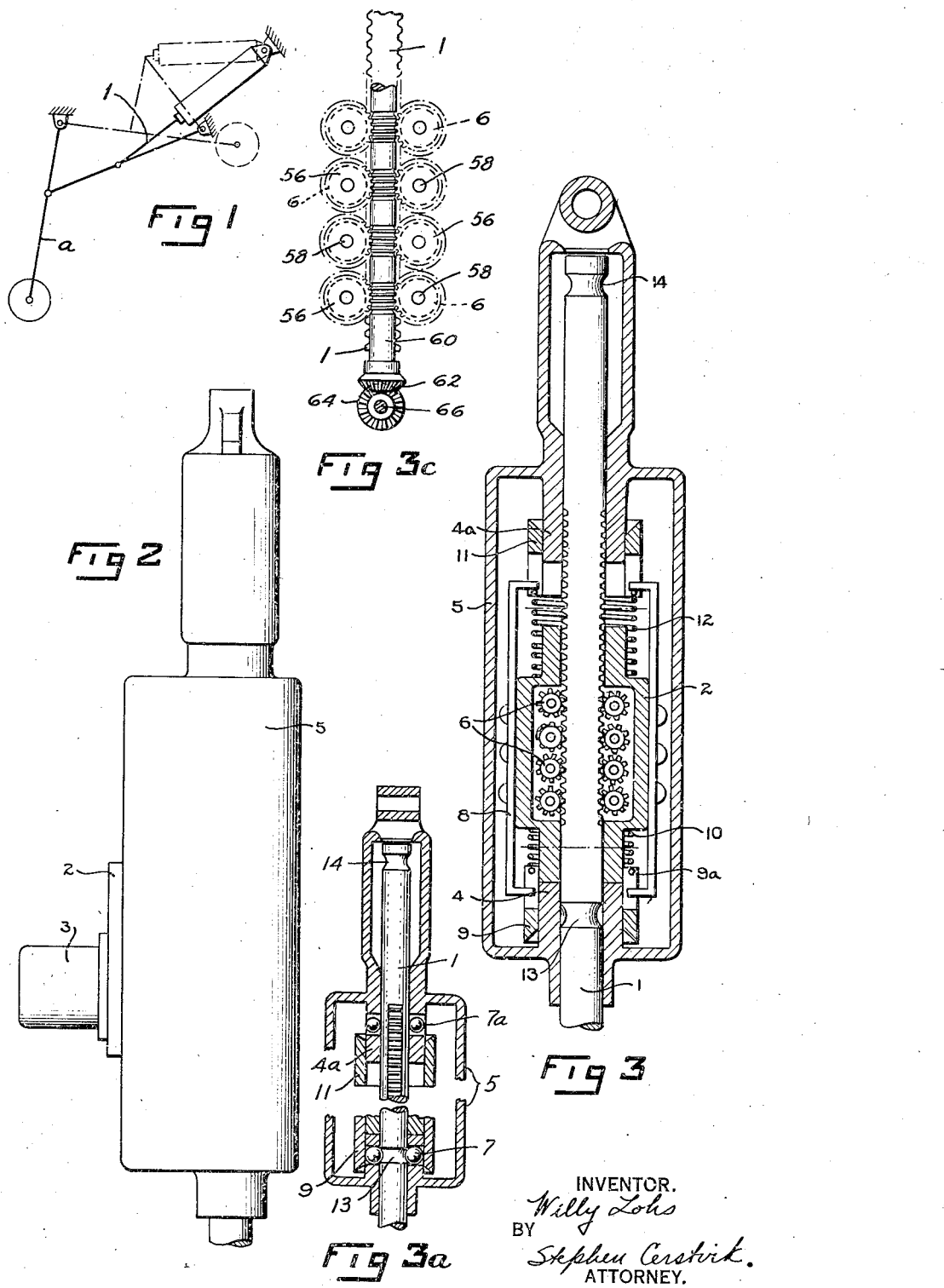

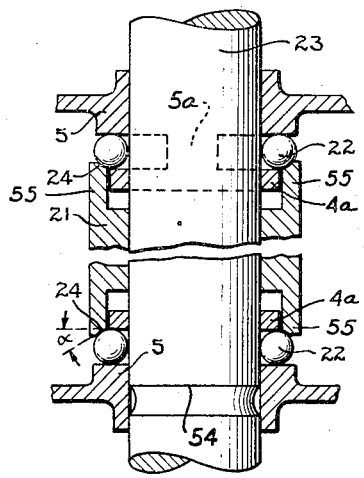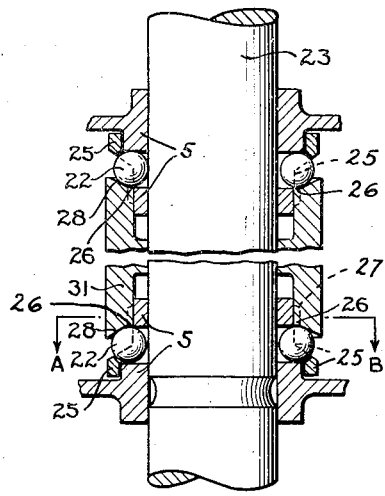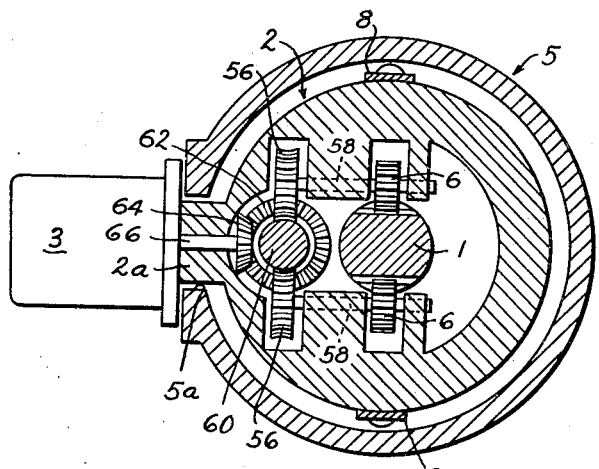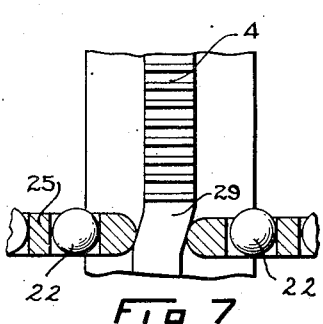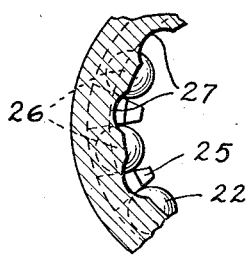

W. LOHS 2,476,154

LOCKING MECHANISM FOR AIRCRAFT
RETRACTIBLE LANDING GEAR

Filed May 16, 1940

INVENTOR.
Willy Lohs
BY
Stephen Cerstvik
ATTORNEY.

Patented July 12, 1949

2,476,154

UNITED STATES PATENT OFFICE 2,476,154

LOCKING MECHANISM FOR AIRCRAFT RETRACTABLE LANDING GEAR

Willy Lohs, Berlin-Siemensstadt, Germany; vested in the Attorney General of the United States Application May 16, 1940, Serial No. 335,638
In Germany May 5, 1939

16 Claims. (Cl. 74—422)

This invention relates to locking mechanism for toothed racks, particularly for adjustable struts for use on airplanes, in which the strut is provided in its periphery with ball receiving notches in which balls are locked and released by cooperating ring-shaped members.

Mechanisms of the above-indicated character have already been proposed for hydraulically operated retracting struts.

The invention relates to a particularly suitable construction of such locking mechanisms for electrically operated adjustable members. It consists in the use of an electric motor drive for said members to release and lock the same.

The essential features of the novel locking mechanism consist in the fact that a motor-driven transmission gear acting upon the balls through the ring-shaped locking members and in engagement with the rack toothed preferably at both sides thereof is provided and that the locking may be released and established upon the relative displacement of the transmitting gear with respect to the toothed rack.

A further object of the invention is to provide a locking mechanism in which the transmission gear is arranged between the locking members and is in engagement through gears with the rack and through catches with the locking members.

A further object of the invention is to provide a locking mechanism in which by the displacement of the rack by means of the transmission gear, the locking member surrounding the balls completely in contact with the restricted portion of the strut is displaced by the catches of the transmission gear, thereby releasing the locking.

A further object of the invention is to provide a locking mechanism in which after releasing the locking by displacing the transmission gear with respect to the rack in the direction towards the locking member the latter is displaced by the catches of the transmission gear with respect to the balls and in which by further displacing the rack with respect to the transmission gear in a direction opposite to the above-said direction the locking may be reestablished.

A further object of the invention is to provide a locking mechanism in which the transmission gear is provided at its both ends with flanges having inwardly slant surfaces which form during the adjustment of the rack the contact surfaces of the transmission gear for the balls which are in engagement with the housing of the locking device, whereas the flanges serve when displaced as locking members surrounding the balls.

A further object of the invention is to provide a locking mechanism in which the toothed rack is provided with cylindrical recesses for the reception of the balls and extending in parallel relation to the axis of the rack, the rack being provided at its both ends with a bent portion and in which the balls are positively guided by the rack in a cage or on a thrust ring, so that when being displaced they are guided in the cylindrical recesses and rest on the straight surface portions of the transmission gear, whereas in the position of rest they are pressed against the slant surfaces of the driving gear.

A further object of the invention is to provide a locking mechanism in which on the rack between the ends thereof and the two circular locking bodies firmly secured to the rack is loosely arranged a pressure ring provided with recesses for the rack and which is guided by means of pins in spiral-shaped slots provided in the casing of the locking mechanism, the recesses and the pins being displaced with respect to each other to such an extent that upon the release of the locking the toothed rack passes through the recesses.

A further object of the invention is to provide a locking mechanism in which the surfaces of the pressure ring and of the casing are inclined with which the balls contact when bringing the balls in and out of engagement with their cooperating surfaces.

In the accompanying drawings are shown some embodiments of the invention in diagrammatic form.

Fig. 1 is a schematical representation of a wheel retracting gear for airplanes.

Fig. 2 is a side elevational view of a retracting strut provided with a driving motor.

Figure 3 is a transverse vertical sectional view taken through Figure 2; Figure 3a is a fragmentary sectional view taken at right angles to Figure 3; Figure 3b is an enlarged horizontal sectional view taken through Figure 2 just above the motor and looking downwardly; Figure 3c is a detail view showing the manner in which the gears 6 are driven by motor 3;

Fig. 4 is a fragmentary sectional view of a similar retracting strut with a modified locking device.

Fig. 5 shows another embodiment of the locking device.

Fig. 6 is a fragmentary sectional view taken along the line A—B of Fig. 5.

Fig. 7 shows a detail of the embodiment shown in Figs. 5 and 6 with the ball cage shown developed.

Figure 8:
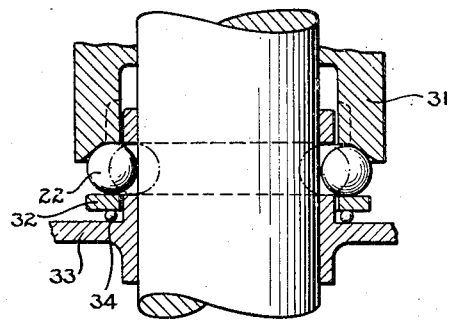

Fig. 8 shows another modified form of the locking device with a ball notch.

Figure 9:
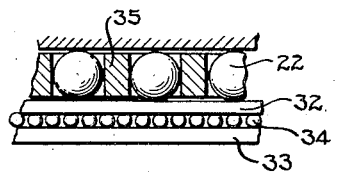

Fig. 9 shows a development of the bearing for the balls.

Figure 10:
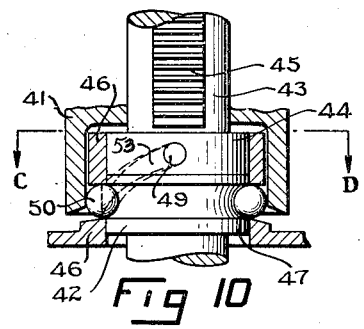

Fig. 10 shows a lateral view partly in section of a modified form of the ball holding device in the locked position.

Figure 11:
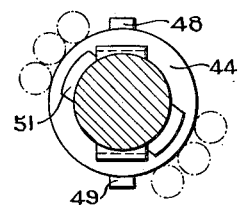

Fig. 11 is a sectional view taken along the line C—D of Fig. 10.

Figure 12:
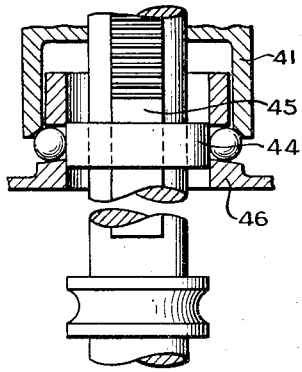

Fig. 12 shows a view corresponding to Fig. 10 in the released position.

Figure 13:
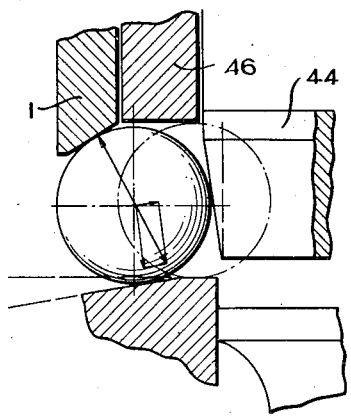

Fig. 13 shows a modification of the ball holding device of Figs. 10 to 12.

To retract and lower the landing gear $a$ (Fig. 1) with the aid of the retracting strut 1, the motor-driven toothed rack cooperating with reduction gears is, for instance, employed instead of the known hydraulic drive without it being necessary to employ a substantially larger space than that required for the hydraulic drive. To relieve the gear it is preferable in such cases to lock both end positions. In this case the locking mechanism must be able to take up when retracting and lowering the landing gear $a$ load which is a multiple of the maximum load of the strut 1. If it were desirable to effect the mechanical displacement of the retracting strut, for instance, with the aid of a spindle drive, a particular locking mechanism might be under circumstances dispensed with; however, in this case the mechanism would have to be rather amply dimensioned in view of the great load. Furthermore, the efficiency would be small and a deflection of the strut might easily cause a jamming in the spindle nut.

As shown in Figures 2, 3, 3a, 3b and 3c, a retracting strut 1 operatively connected to the landing gear is provided with racks preferably on two diametrically opposite sides thereof. A transmission gear cage 2, to which an electric motor 3 is rigidly secured by means of flanges or the like 2a projecting through casing slot 5a, is mounted for axial movement relative to the casing 5, said movement being limited in opposite directions by the stops 4 and 4a formed on the casing. A plurality of gears 6, eight being shown, are mounted in the gear cage 2, and are driven by the motor 3 through a bevel pinion 64 on its shaft 66, the bevel pinion 64 being meshed with a bevel gear 62 on a vertical worm 60 in mesh with wormwheels 56 on shafts 58 on which the gears 6 are mounted in mesh with the racks on the strut 1; so that rotation of gears 6 while strut 1 is held stationary causes axial movement of the gear cage 2 in a direction determined by the direction of rotation of gears 6. However, when the gear cage 2 is held stationary, for example, by engagement with the stop 4, and strut 1 is not locked against movement, rotation of gears 6 in a direction to apply an upward force to the strut, will move the strut axially upwardly. Downward movement of the strut is produced when the gears 6 apply a downward force and the resistance to movement of the strut is less than the force required to move the gear cage 2 upwardly relative to the strut. The locking is effected by the balls 7 and 7a respectively which at the end positions are in engagement with the notched portions 13 and 14 of the strut 1. The retracting strut is locked as shown in Fig. 3 in the retracted position. If the strut is to be lowered the motor 3 is rotated in such a direction as to cause the transmission gear cage 2 to move in the upward direction with respect to the strut 1. In this case the locking device is moved in the upward direction by the catches 8 which come into engagement with the pins 9a secured to the locking ring 9. At the same time by the interposition of the spring 12 the upper locking ring 11 is pressed against the upper balls 7a. As soon as the upper edge of the slant surface of the ring 9 has passed when moving in the upward direction beyond the center of the balls 7, the latter are pressed in the outward direction by the force of the strut 1 stressed by the weight of the landing gear and come into engagement with the slant surface of the ring 9. After the balls 7 have released the strut 1 the latter moves together with the transmission gear cage 2 in the downward direction until the gear cage comes into engagement with the stop 4 of the casing 5, thus compressing the spring 10, whereas the ring 9 comes to rest on the balls 7. Consequently, the strut permits the landing gear to be gradually lowered until the counterpressure has become so great that an additional compressive force must be brought about by the strut. As soon as this condition has been fulfilled, the transmission gear cage 2 moves in the upward direction till it contacts with the ring 11, thus causing the ring 11 to be pressed against the upper balls 7a, and the springs 12 are compressed, whereas the springs 10 are relieved of the compressive force. The landing gear may now be lowered to the end position. As soon as the end position is reached, the ring 11 presses the balls 7a into the upper restricted portion 14 of the strut 1 and moves in the upward direction to press the balls 7a against the restricted portion 14, thereby locking the strut 1. The landing gear is retracted in the reverse manner.

To prevent the strut and the transmission gear cage from being suddenly released and the transmission gear cage from striking the stop 4 undesirably, under any circumstances, when unlocking the ball holding device, the locking mechanism may be designed in the manner shown in Figure 4.

In this embodiment the slant surfaces 24 of the transmission gear cage 21 are in engagement with the balls 22 when the landing gear is being retracted or lowered. As in the first embodiment, ring-shaped guides or stops 4 and 4a are disposed above the lower balls and below the upper balls, respectively, said guides being formed with or secured to casing 5. One or more axial connecting arms 5a (Fig. 4) are preferably provided to join guide rings 4 and 4a to casing 5, said arms extending between balls 22. If the upper edge 54 of the restricted portion of the strut 23 passes beyond the center of the balls when the strut is being retracted, the balls are caused by the transmission gear cage 21 which moves slowly in a direction opposite to the direction of the strut to glide into the restricted portion of the strut. If the balls 22 fit snugly the restricted portion of the strut 23 so as to lock the latter, the extensions 55 of the transmission gear cage 21 are moved over the balls 22, thus locking the strut in the end position. When the landing gear is being lowered the transmission gear cage 21 moves in the upward direction to such an extent as to permit the release of the balls which upon the further displacement of the transmission gear cage 21 are pressed against the slant surfaces thereof, thereby preventing the balls from falling out. In order that the pressure of the balls against the strut does not become too great during the retraction and lowering of the landing gear, the angle $\alpha$ at which the surface 24 is inclined must be relatively small.

To prevent the balls from being pressed against the strut during the retraction or lowering of the landing gear, the locking device may be modified in a manner as shown in Figs. 5 to 7. The locking device is designed in the same manner as shown in the embodiment in Fig. 4 except that the balls 22 are arranged in a particular ball cage 25 which with respect to the transmission gear cage 31 is rotatably mounted on the toothed rack 29. In this case the toothed rack is bent at the ends as shown in Fig. 7. At the same time the transmission gear cage 31 is designed at the point at which it is in engagement with the balls 22 in the manner as shown in Figs. 5 and 6, i. e., the straight contact surface portion 26 of the transmission gear cage 31 perpendicular to the axis of the strut is in engagement with the balls during the retraction and lowering of the strut.

In the neighborhood of the end position of the adjustable strut, the bent end 29 of the toothed rack 4 rotates the ball cage 25 to such an extent that the balls come into engagement with the cylindric grooves 27 of the transmission gear cage 31. As long as the upper edge of the restricted portion of the strut has not yet passed beyond the center of the ball, the slant surface 28 of the transmission gear cage rests on the balls and presses the same against the strut. However, if the upper edge of the restricted portion of the strut passes beyond the center of the ball, the balls move radially into the restricted portion, and the transmission gear cage is then slowly lowered. In the end position of the strut the balls fit snugly the restricted portion of the strut and prevent a further movement of the same. The transmission gear cage with its cylindric notches 27 is now allowed to move in the downward direction beyond the center of the balls, thus locking the strut in the end position. When the strut is to be lowered, the transmission gear cage moves in the upward direction, releases the balls which are pressed outwardly and come into engagement with the slant surface 28 of the transmission gear cage 31. As soon as the strut is released the ball cage is again rotated in such a manner as to cause the balls to come into engagement with the straight surface 26 of the transmission gear cage 31 so that when the strut is lowered to a further extent they no longer exert a radial pressure on the strut. In this manner any sudden change of the position of the strut and the transmission gear cage is prevented in the embodiment just described.

To disconnect the driving motor, end switches are employed, which are actuated when the transmission gear 31 reaches the lower and upper end position.

Figs. 8 and 9 show an improved ball holding arrangement according to Figs. 5 to 7 in which the gliding of the balls is prevented during the rotation of the ball cage by means of a thrust bearing for the balls. The latter contact the ring 32 in the position shown which permits the balls to roll when the ball cage 35 is being rotated. The ring in turn is rotatably mounted with respect to the casing 33, since it is supported on balls 34. To displace the balls 22 with respect to the casing 31, the ring 32 only is preferably rotated. In this case only half the power is necessary as compared to that necessary for rotating the ball cage 25 according to the previous embodiment, the angle of displacement must, however, be twice as great as that of the preceding embodiment (see Fig. 9).

A further embodiment is shown in Figs. 10 to 12. The transmission gear cage 41 is substan- tially designed in the same manner as that shown in Fig. 4. A locking ring 42 provided with the restricted portion 47 is firmly secured to the strut 43. The pressure ring 44 which loosely surrounds the strut 43 between the end of the toothed rack 45 and the locking ring 42 is guided in two spiral-shaped slots 53 of the casing 46 with the aid of pins 48 and 49. The balls 50 do not surround the entire periphery of the strut 43. They are symmetrically arranged with respect to the diameter of the strut as will be seen from Fig. 11. Axial recesses 51 are provided in ring 44, said recesses having a cross-sectional area sufficient to permit passage of racks 45 therethrough when said recesses are in axial alignment with said racks. When balls 50 are held in restricted portion 47 by gear 41, as shown in Fig. 10, ring 44 has recesses 51 angularly displaced relative to racks 45 (Fig. 11) and pins 48, 49 are in the upper ends of slots 53.

In this embodiment the strut is lowered in the following manner: The transmission gear cage 41 moves at first in the upward direction and releases the balls 50 so that the latter are allowed to leave the restricted portion 47, whereupon the strut 43 moves in the downward direction. The toothed rack 45 is thus pressed against the pressure ring 44 which is forced in the downward direction and carries out a rotation owing to the spiral-shaped slots in the casing 46. Ring 44 is thus moved past balls 50 into the position shown in Fig. 12, i. e., between said balls and strut 43. During this downward axial movement of ring 44 the angular movement imparted thereto causes recesses 51 to become aligned with racks 45 and, as a result, when ring 44 reaches the axial position shown in Fig. 12, said ring has rotated sufficiently to permit racks 45 to pass through recesses 51. Ring 44 remains stationary during the further downward movement of strut 43 and is moved back into the position shown in Fig. 10 only when engaged again by locking ring 42 on the upward movement of strut 43 during retraction.

To lock the strut in the lowered position the same locking arrangement is employed in the upper end of the transmission gear.

When the strut is in the retracted position the ring 42 entrains the pressure ring 44 in the upward direction which is rotated again to the initial position and the balls 50 glide again into the restricted portion 47 of the ring 42.

To improve the conditions of friction when locking and unlocking the strut, the contact surfaces of the pressure ring 44 and of the casing 46 for the balls 50 may be slanted off as shown in Fig. 13.

What is claimed is:

1. An adjustable strut for aircraft retractible landing gear comprising a housing, a shaft mounted for axial displacement in said housing, a driving member operative in one direction for axially moving said shaft to its fully retracted position relative to said housing and in another direction for axially moving said shaft to its fully extended postion relative to said housing, locking means for maintaining the shaft in its fully retracted position, said shaft having the portion thereof adjoining said locking means when in fully retracted position formed in a manner to cooperate with said locking means to enable the latter to operate, locking means for maintaining the shaft in its fully extended position, said shaft having the portion thereof adjoining said locking means when in fully extended position formed in a manner to cooperate with said locking means to enable the latter to operate, means actuated during operation of said driving member in displacing said shaft to its fully retracted position to urge said first-named locking means to an operative position to lock said shaft in its fully retracted position, and means actuated during operation of said driving member in displacing said shaft to its fully extended position to urge said second-named locking means to an operative position to lock said shaft in its fully extended position.

2. An adjustable strut for aircraft retractible landing gear comprising a housing, a shaft mounted for axial displacement in said housing, a driving member operative in one direction for axially moving said shaft to its fully retracted position relative to said housing and operative in another direction for axially moving said shaft to ts fully extended postion relative to said housing, a shaft lock operative in response to the operation of said driving member in the one direction to lock said shaft when the latter has been displaced to its fully retracted position, said shaft having the portion thereof adjoining said lock when in fully retracted position formed in a manner to cooperate with said lock to enable the latter to operate, and a second shaft lock operative in response to the operation of said driving member in said other direction to lock said shaft when the latter has been displaced to its fully extended position, said shaft having the portion thereof adjoining said lock when in fully extended position formed in a manner to cooperate with said lock to enable the latter to operate.

3. In apparatus of the class described, a housing, a strut member mounted for axial movement within said housing and having recesses therein, a driving member upon the housing for axially displacing said strut member, said driving member being axially movable upon said housing between predetermined limits, and a plurality of locking means for engaging the recesses in said strut member in response to axial movement of the driving member.

4. In apparatus of the class described, a housing, a shaft mounted for axial movement within said housing having recesses therein and a rack thereon, a driving member mounted on the housing for engaging said rack and axially displacing said shaft, said driving member being axially movable relative to the housing between predetermined limits, and a plurality of locking means for engaging the recesses in said shaft in response to axial movement of the driving member.

5. In apparatus of the class described, a housing, a strut member mounted for axial movement within said housing having recesses therein and a rack thereon, a driving member upon the housing for engaging said rack and axially displacing said strut member, said driving member being axially movable relative to the housing and a plurality of locking means operative during axial movement of said driving member to engage the recesses in said strut member.

6. In apparatus of the class described, a housing, a strut member mounted for axial movement within said housing having recesses therein, a driving member mounted upon the housing for axially displacing said strut member, said driving member being axially movable relative to said housing, and locking means operative during axial movement of said driving member to engage one of said recesses in said strut member, said locking means including ball bearing means normally engaging the outer periphery of said strut member, and a sleeve member surrounding said strut member movable with said driving member for surrounding and maintaining said ball bearing means in engagement with said one recess in said strut member.

7. In apparatus of the class described, a housing, a strut member mounted for axial movement within said housing having recesses therein and a rack thereon, a driving member axially movable between predetermined limits upon the housing for engaging said rack and axially displacing said strut member, ball bearings normally surrounding the outer periphery of said strut member, and a cylindrical sleeve member having a flared portion normally surrounding and engaging said ball bearings, said sleeve member being movable with said driving member for urging and maintaining said ball bearings in engagement with one of said recesses in said strut member, said ball bearings and said sleeve member defining a locking means for the strut member when the latter has been axially displaced.

8. An adjustable strut for aircraft landing gear comprising a housing, a shaft mounted for axial movement within said housing, a driving member surrounding said shaft, locking means surrounding said shaft at one end of said driving member, and locking means surrounding said shaft at the opposite end of said driving member, said driving member being operative in one direction to raise said shaft to its fully retracted position and in another direction to lower said shaft to its fully extended position, said first-named locking means actuated during operation of the driving member in the one direction displacing the shaft to its fully retracted position to maintain said shaft in said retracted position, said second-named locking means actuated during operation of the driving member in said other direction displacing the shaft to its fully extended position to maintain said shaft in said extended position, said strut having portions thereof formed for cooperation with said locking means to enable the latter to operate.

9. In an extensible and retractible strut for aircraft landing gear having a housing, a shaft mounted for axial movement within said housing, means for locking said shaft when the latter is in its fully retracted position, a driving member axially movable between predetermined limits upon the housing for axially displacing said shaft to its fully extended position, said driving member being moved initially in a direction opposite to the direction of movement to be taken by said shaft, said locking means being disengaged by the initial movement of said driving member thereby permitting movement of said shaft in a downwardly direction carrying said driving member therewith to one of said predetermined limits, said driving member acting thereafter to axially displace said shaft to its fully extended position, and means actuated by said driving member when said shaft has reached its fully extended position to lock said shaft in said last-named position, said strut having portions thereof formed for cooperation with said locking means to enable the latter to operate.

10. In an extensible and retractible strut for aircraft landing gear having a housing, a shaft mounted for axial movement within said housing, means comprising a sleeve provided with an inclined portion and ball bearing means engaging a recess in said shaft for locking the shaft when the latter is in its fully retracted position, a driving member axially movable between predetermined limits upon the housing for axially displacing said shaft to its fully extended position, said driving member being moved initially in a direction opposite to the direction of movement to be taken by said shaft thereby axially displacing said sleeve whereby said ball bearing means are forced against the inclined portion of said sleeve by the downward thrust of said shaft thus disengaging said locking means and permitting downward movement of said shaft and said driving member until the latter engages one of said predetermined limits, said driving member acting thereafter to axially displace said shaft to its fully extended position, and means comprising ball bearing means engaging the shaft and a second sleeve member operated by said driving member when the shaft has reached its fully extended position to surround and urge said last-named ball bearing means into a recess in said shaft to lock said shaft in said last-named position.

11. In apparatus of the class described, a housing, a strut member mounted for axial movement within said housing and having recesses therein, a driving member axially movable between predetermined limits upon the housing for axially displacing said strut member, and locking means operative during axial movement of said driving member to engage one of said recesses in said strut member, said locking means including ball bearing means normally engaging the outer periphery of said strut member, and a sleeve formed integrally with said driving member for surrounding and maintaining said ball bearing means in engagement with said one recess in said strut member.

12. In apparatus of the class described, a housing, a strut member mounted for axial movement within said housing and having recesses therein, a driving member axially movable between predetermined limits upon the housing for axially displacing said strut member, and a locking device operative during axial movement of said driving member to engage one of said recesses in said strut member, said locking device comprising means provided with ball bearings normally engaging the outer periphery of said strut member, means carried by said strut member for rotating said ball bearings, and a sleeve formed with said driving member for surrounding and maintaining said ball bearings in engagement with said one recess in said strut member.

13. In apparatus of the class described, a housing, a strut member mounted for axial movement within said housing and having recesses therein, a driving member axially movable between predetermined limits upon the housing for axially displacing said strut member, and locking means operative during axial movement of said driving member to engage one of said recesses in said strut member, said locking means comprising ball bearing means concentric with said strut member, a ring rotatably mounted on said strut member interposed between said ball bearing means and said strut member, means for rotating said ring member when said strut member is axially displaced whereby said ball bearing means engage said strut member, and means operative during movement of said driving member to urge said ball bearings to engage said one recess in said strut member.

14. In apparatus of the class described, a housing, a strut member mounted for axial movement within said housing and having recesses therein, a driving member axially movable between predetermined limits upon the housing and operative to axially displace said strut member, and locking means operative during axial movement of said driving member to engage one of said recesses in said strut member, said locking means including ball bearing means normally engaging the outer periphery of said strut member and a sleeve resiliently connected with said driving member for surrounding and maintaining said ball bearing means in engagement with said one recess in said strut member.

15. In apparatus of the class described, a housing, a shaft mounted for axial movement within said housing, said shaft having a recess therein and a rack thereon, a driving member mounted on the housing for engaging said rack and axially displacing said shaft, said driving member being axially movable relative to the housing between predetermined limits, and locking means for engaging the recess in said shaft in response to axial movement of the driving member.

16. In apparatus of the class described, a housing, a strut member mounted for axial movement within said housing, a driving member mounted upon the housing for engaging said strut member and axially displacing the latter, said driving member being axially movable relative to the housing, and locking means rendered operative by axial movement of said driving member to hold said strut member against movement when the latter has reached a predetermined position, said strut member having a portion thereof formed for cooperation with said locking means so as to enable the latter to operate.

WILLY LOHS.

REFERENCES CITED

The following references are of record in the file of this patent:

UNITED STATES PATENTS

| Number | Name | Date |
|---|---|---|
| 1,363,203 | Gartin | Dec. 21, 1920 |
| 2,182,333 | Cowey | Dec. 5, 1939 |